United States Patent

Nakagawa et al.

[11] Patent Number: 5,946,447
[45] Date of Patent: Aug. 31, 1999

[54] APPARATUS AND METHOD FOR RECORDING/RETRIEVING DATA ON/FROM A DISK HAVING DATA STORED THEREON IN A LOGICAL HIERARCHY

[75] Inventors: Masaki Nakagawa, Zama; Hideki Mimura, Yokohama, both of Japan

[73] Assignee: Kabushiki Kaisha Toshiba, Kawasaki, Japan

[21] Appl. No.: 08/976,957

[22] Filed: Nov. 24, 1997

Related U.S. Application Data

[63] Continuation of application No. 08/409,610, Mar. 24, 1995, abandoned.

[30] Foreign Application Priority Data

Mar. 28, 1994 [JP] Japan .................................. 6-057815

[51] Int. Cl.[6] .......................... H04N 5/781; H04N 5/928
[52] U.S. Cl. ................... 386/95; 386/98; 386/126
[58] Field of Search .................. 386/33, 40, 45, 386/95, 98, 109, 111, 112, 125, 126, 59; 348/409; 360/32, 48, 49, 39, 40; 369/48, 54; H04N 5/76, 5/92, 9/79, 5/781, 5/928

[56] References Cited

U.S. PATENT DOCUMENTS

| | | |
|---|---|---|
| 4,777,537 | 10/1988 | Ueno et al. .............................. 358/341 |
| 4,964,094 | 10/1990 | Satoh et al. . |
| 5,132,954 | 7/1992 | Kulakowski et al. ..................... 369/48 |
| 5,434,678 | 7/1995 | Abecamis ................................. 358/342 |
| 5,504,585 | 4/1996 | Fujinami et al. ......................... 386/111 |
| 5,513,010 | 4/1996 | Kori et al. ............................... 358/341 |
| 5,565,921 | 10/1996 | Sasaki et al. ............................ 348/409 |

FOREIGN PATENT DOCUMENTS

| | | |
|---|---|---|
| 0 424 903 A2 | 5/1991 | European Pat. Off. . |
| 0 465 246 A2 | 1/1992 | European Pat. Off. . |
| 0 472 343 A1 | 2/1992 | European Pat. Off. . |
| 0 542 377 A2 | 5/1993 | European Pat. Off. . |
| 0 558 848 A2 | 9/1993 | European Pat. Off. . |
| 0 570 922 A2 | 11/1993 | European Pat. Off. . |

*Primary Examiner*—Thai Tran
*Attorney, Agent, or Firm*—Pillsbury Madison & Sutro LLP

[57] ABSTRACT

An optical disk on which data is recorded as a variable length data unit, the data unit being composed of a header, sub video data, audio data, and main video data on a logical format and of a plurality of sectors on a physical format, each sector including as sector link data a control area head sector number, an identification flag, a BOOK number, a story number, a program number, DUT identification, a next program head sector number, a previous program head sector number, a next DUT head sector number, a present DUT head sector number, and a previous DUT head sector number, all recorded thereon. Accordingly, the need for storing a control table in the reproduction apparatus is eliminated.

6 Claims, 6 Drawing Sheets

| STORY A | STORY B |
|---|---|
| NUMBER OF PROGRAMS : 7 | NUMBER OF PROGRAMS : 7 |
| PROGRAM 0 | PROGRAM 0 |
| PROGRAM 1 | PROGRAM 1 |
| PROGRAM 2 | PROGRAM 2 |
| PROGRAM 3 | PROGRAM 7 |
| PROGRAM 4 | PROGRAM 8 |
| PROGRAM 5 | PROGRAM 5 |
| PROGRAM 6 | PROGRAM 6 |

FIG. 4

| |
|---|
| PROGRAM 0   START SECTOR NUMBER |
| PROGRAM 0     END SECTOR NUMBER |
| PROGRAM 1   START SECTOR NUMBER |
| PROGRAM 1     END SECTOR NUMBER |
| PROGRAM 2   START SECTOR NUMBER |
| PROGRAM 2     END SECTOR NUMBER |
| ⟩⟨ |
| PROGRAM N   START SECTOR NUMBER |
| PROGRAM N     END SECTOR NUMBER |

APPARATUS AND METHOD FOR RECORDING/RETRIEVING DATA ON/FROM A DISK HAVING DATA STORED THEREON IN A LOGICAL HIERARCHY

This is a continuation of application Ser. No. 08/409,610, filed on Mar. 24, 1995, which was abandoned upon the filing hereof.

BACKGROUND OF THE INVENTION

1. Field of the Invention

The present invention relates to a method of recording/reproducing optical disks having audio and video signals recorded thereon, and to such optical disks, and further to an apparatus for and a method of reproducing audio and video signals from such optical disks.

2. Description of the Related Art

Recently, disk reproducing apparatuses have been developed for reproducing audio and picture images recorded on an optical disk. Such disks are being utilized for storing movies, software and karaoke, for example. Further, reproduction apparatuses for reproducing speech data and picture data digital-recorded on an optical disk are also known, and are commercially available as karaoke systems, for example. The above optical disk is the same size as a CD (compact disk) so that the entire reproducing apparatus can be miniaturized.

Figure 9:
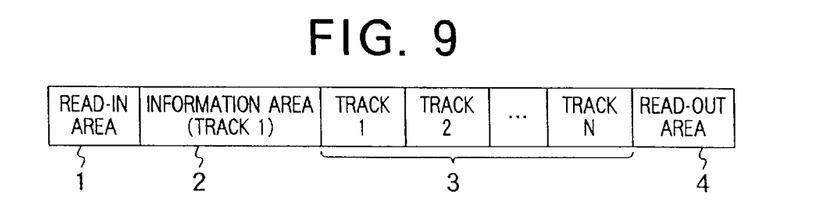
FIG. 9 is a view illustrating a recording format in a conventional optical disk.

FIG. 9 is a view illustrating a recording format for such an optical disk.

Figure 10:
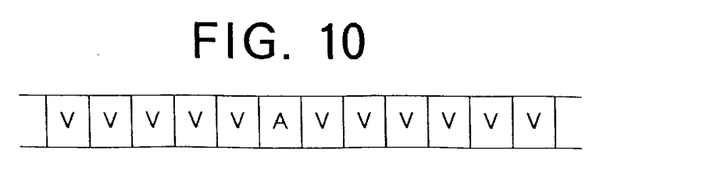
FIG. 10 is a view illustrating a data stream recorded in a data area in FIG. 9.

As illustrated in FIG. 9, the recording format comprises a read-in area 1, an information area 2, a data area 3, and a read-out area 4. A track (program) 1 corresponds to the information area 2. Tracks 2 up to 99 are disposed in the data area 3 and contain compressed video data and compressed audio data. Each track (program) in the data area 3 comprises, physically, an array of video data V and audio data A separated in sectors as illustrated in FIG. 10, wherein there are arranged about six successive video sectors V and one audio sector A, such that a video signal and a sound signal are synchronized.

A control table indicative of a reproduction procedure of a program stored in the data area 3 is recorded in the information area 2. In the case of a movie for example, since one movie comprises a series of programs, a control table indicative of a reproduction procedure among these programs is essential. A disk reproduction apparatus previously stores the control table in a memory upon starting the reproduction of a disk, and continuously reproduces the programs in conformity with the procedure recorded in the control table. A greater memory capacity is therefore required for the disk reproduction apparatus having a memory that is capable of storing all of the contents in the control table.

Recently, compression encoding of audio data and video data has been done using the MPEG (Moving Picture Image Coding Expert Group) system of the International Standard Specification, which comprises data in a variable length. It is theoretically possible to control with the control table such information of a GOP (Group of Picture) being a coding unit of an MPEG video signal as a sector and a position (bit) in the sector where the GOP exists, in order to improve a random access property. Construction of such a control table, however, complicates processing on the system side, and in addition, requires a greater memory capacity. Accordingly, such control is limited in practice to that on the program unit basis.

Accordingly, a conventional reproduction apparatus is required to have a greater memory capacity for storing the contents in a control table recorded on a recording medium. Further, data control on a control table is limited to a case where it is executed by a program basis and hence fails to have a satisfactory random access property.

SUMMARY OF THE INVENTION

For solving these problems, it is an object of the present invention to provide a method of recording/reproducing video or audio data wherein the need for a memory in which a control table is stored is eliminated from the reproduction apparatus, and to provide a disk and an apparatus for and a method of reproducing the disk according to this method.

Another object of the present invention is to provide a recording/reproducing method having an improved random access property, wherein reproduction is started from an arbitrary unit in the course of the program, and to provide a disk and an apparatus for and a method of reproducing the disk according to this method.

That is, the present invention relates to a method of recording/reproducing video data or audio data comprising the steps of recording a plurality of data units each data unit being composed of a plurality of sectors such that the data unit constitutes a series of programs, wherein each sector includes sector link data and real data. The sector link data includes address information of the data unit or a program related to each sector, and the real data includes video data or audio data; and accessing a second sector using the address information of the data unit or program recorded on a first sector.

In this invention, since address information of at least a head sector of a next program is recorded in each sector, a reproduction order among the programs can be obtained without using information of the control table by reading the address information with a reproduction apparatus, so that a plurality of programs are continuously reproduced. The memory for the control table can therefore be eliminated from the reproduction apparatus.

According to the present invention, besides address information of a head sector of a next program, address information of at least a head sector of next data unit is recorded in each sector, so that reproduction can be started from an arbitrary data unit unit in the course of the program. More specifically, in the reproduction apparatus according to the present invention, once a switching request to switch the operation to program reproduction after arbitrary time T is accepted, a head sector of the program after time T is searched for and the head sector is retrieved through a track jump. When the head sector is retrieved, address information of a head sector of the next data unit recorded on the sector is read, so that reproduction is executed from the head sector of the next data unit on the basis of the address information.

The above and other objects, features, and advantages of the present invention will become more apparent from the following description when taken in conjunction with the accompanying drawings.

DESCRIPTION OF THE PREFERRED EMBODIMENT

In what follows, a preferred embodiment according to the present invention will be described referring to the drawings.

Figure 1:
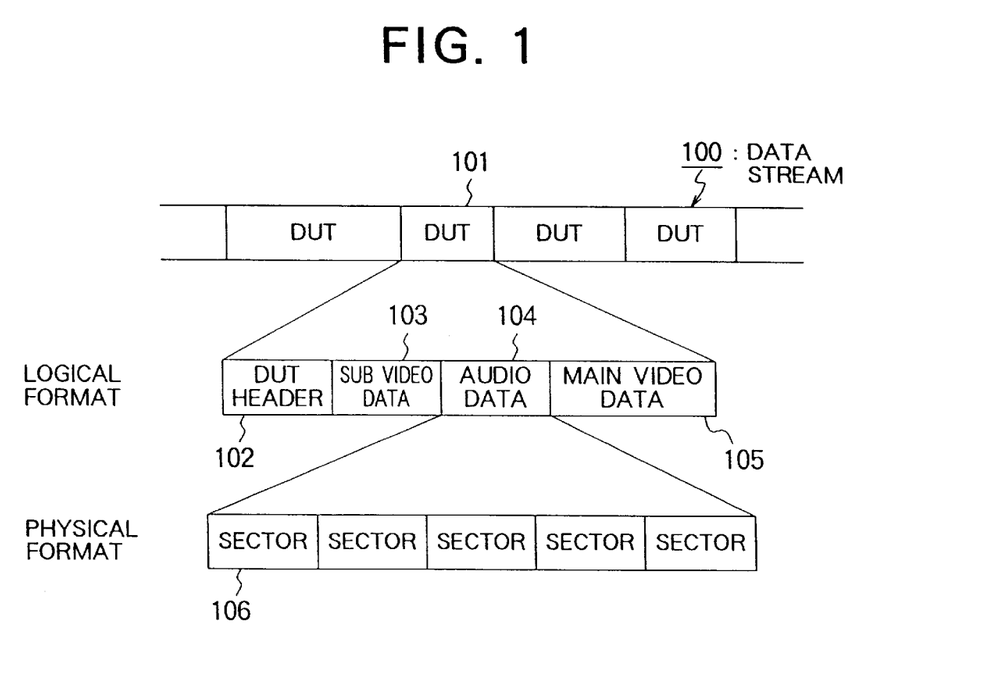
FIG. 1 illustrates a relationship between a physical format and a data unit and a logical format on an optical disk according to the present invention.

FIG. 1 is a view illustrating a relationship between a physical format and a logical format on an optical disk that is a recording medium of an embodiment according to the present invention. In FIG. 1, numeral 100 is a data stream recorded on the optical disk. The data stream 100 comprises an arrangement of variable length data units (hereinafter, simply referred to as DUTS.) 101. The DUT 101 comprises a DUT header 102, sub video data 103, audio data 104, and main video data 105 on the logical format. The sub video data 103, audio data 104, and main video data 105 are variable length compression data, and signal lengths thereof are defined, respectively, based on a predetermined reproduction time. Data in the DUT 101 comprises a plurality of sectors 106 on the physical format.

Figure 2:
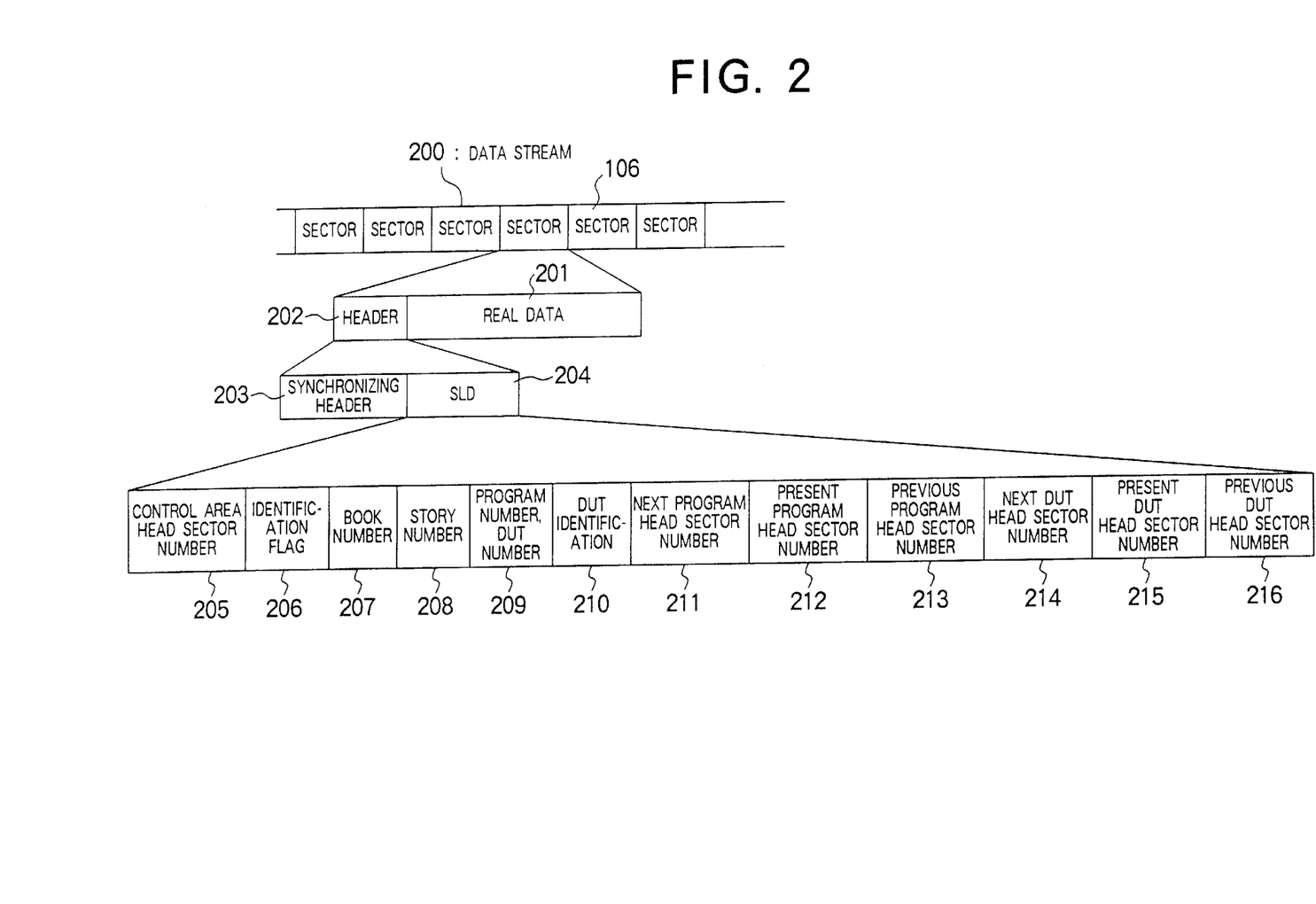
FIG. 2 is a view illustrating a construction of the sector shown in FIG. 1.

FIG. 2 is a view illustrating the structure of the sector 106.

As illustrated in FIG. 2, a sector 106 comprises a header 202 and real data 201. The header 202 comprises a synchronizing header 203 on which the number of the sector 106 and a synchronizing signal for establishing synchronization upon reproduction of the data are recorded, and sector link data (hereinafter, simply referred to as SLD.) 204. The SLD 204 comprises a control area head sector number 205, an identification flag 206, a BOOK number 207, a story number 208, a program number and a DUT number 209, a DUT identification 210, a next program head sector number 211, a present program head sector number 212, a previous program head sector number 213, a next DUT head sector number 214, a present DUT head sector number 215, a previous DUT head sector number 216.

Details of the story number 208 and the program number 209 are as follows.

The term "story" refers to a group of video data and audio data both having a relationship on the logical format. For example, the video and audio data defining motion picture correspond to a story. One story or a plurality of such stories exist on one disk. The story consists of a plurality of programs. The plurality of stories on the same disk may share partial video and/or audio data. For example, assume two that stories A, B are recorded on the same disk, and story A is includes a violence scene which might have a bad influence upon juveniles. In this case, there can be recorded as the other story B quite the same video and audio (program) as the story A except for the violence scene, which is replaced with another video and audio (program) in the story B.

Figure 3:
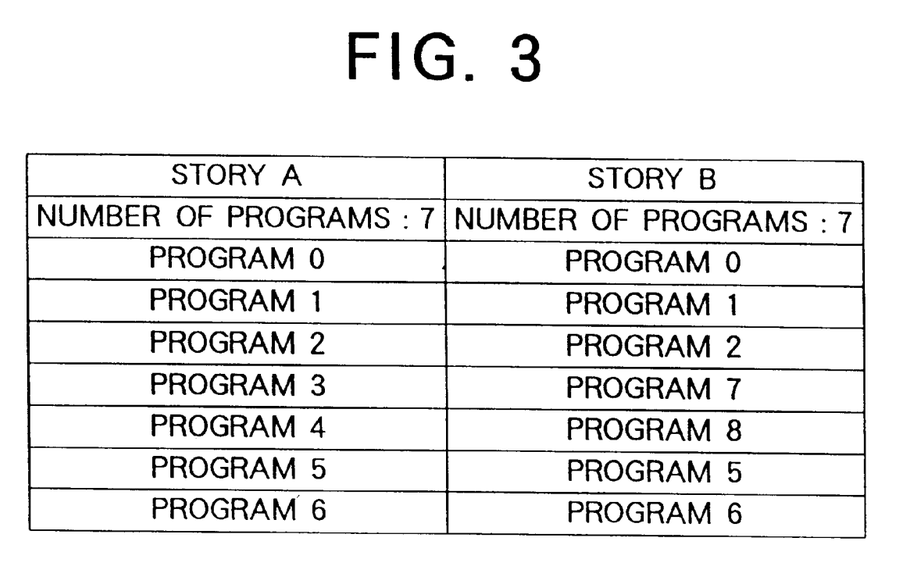
FIG. 3 is a view illustrating an example of a story control table.

FIG. 3 is a view illustrating an example of a story control table recorded on the control area on the optical disk.

As illustrated in FIG. 3, on the table there are recorded the number of programs of each story and a series of the numbers. Herein, the programs 3 and 4 of the story A correspond to the aforementioned violence scene, and in the story B those programs are replaced by programs 7 and 8 of a scene without any violence. In this instance, programs 0, 1, 2, 5, and 6 are shared by the stories A and B for effective utilization of disk capacity.

Figure 4:
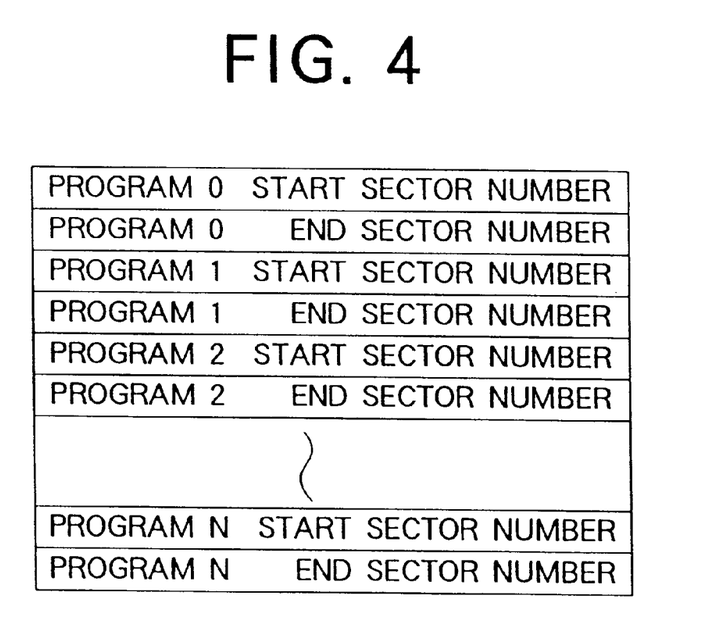
FIG. 4 is a view illustrating an example of a program control table.

FIG. 4 is a view illustrating an example of a program control table recorded on a control area on the optical disk.

As illustrated in FIG. 4, the table includes start sector numbers and end sector numbers of programs 0–N recorded thereon.

In the following, there will be described an optical disk reproduction apparatus for reproducing data from a disk having such a recording format.

Figure 5:
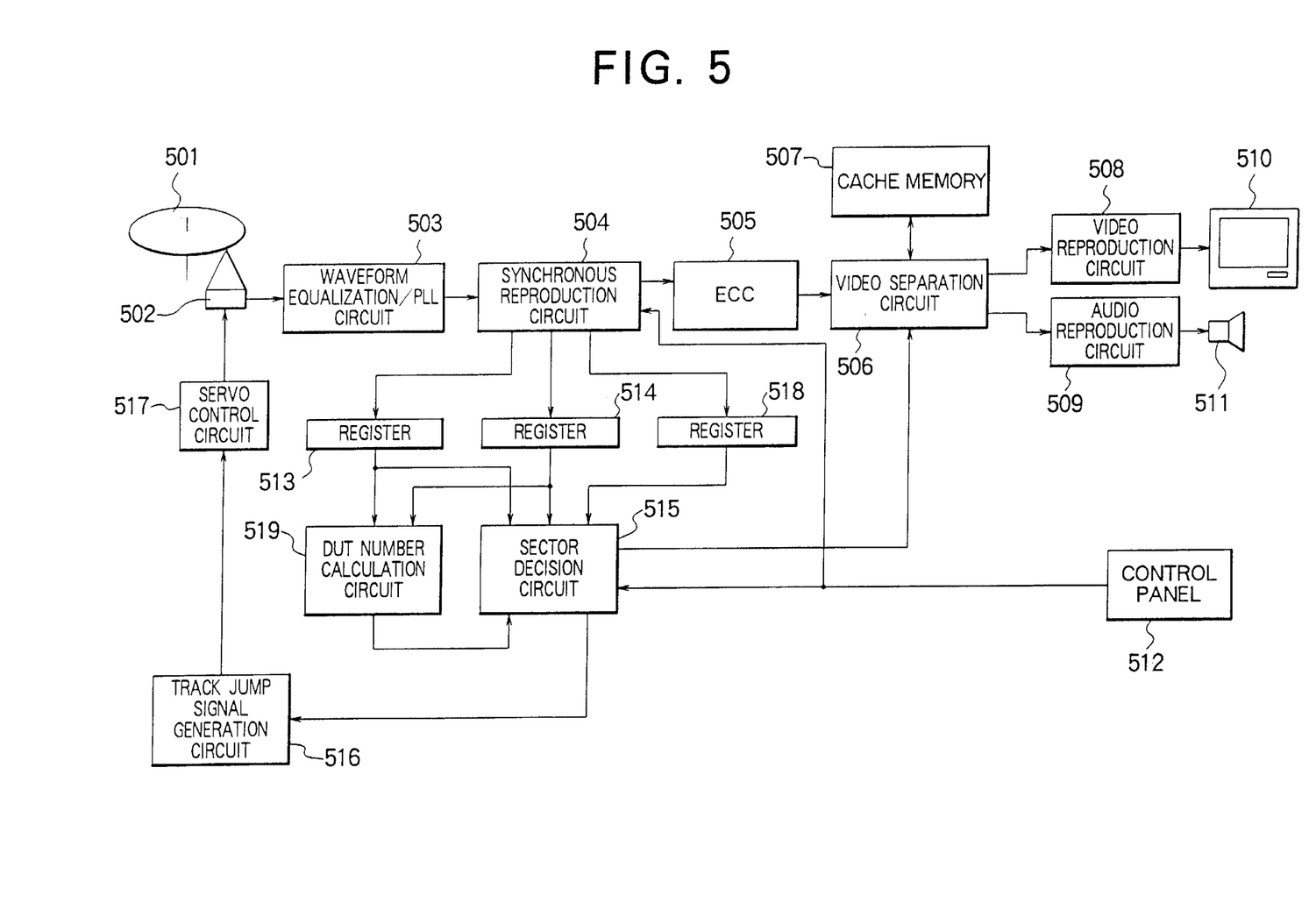
FIG. 5 is a block diagram illustrating an optical disk reproduction apparatus according to the present invention.

FIG. 5 is a block diagram schematically illustrating the hardware construction of the optical disk reproduction apparatus.

In FIG. 5, numeral 501 denotes an optical disk, and numeral 502 denotes a pickup for irradiating the optical disk 501 with laser light and reading the intensity of reflected light thereof as a reproduction signal. The reproduction signal obtained by the pickup 502 is input into a waveform equalization/PLL circuit 503 where it is subjected to processing, such as waveform equalization, data slicing, etc., and is sent to a synchronous reproduction circuit 504 as a data stream. The synchronous reproduction circuit 504 detects a synchronizing header 203 on a sector illustrated in FIG. 2 from the data stream and supplies data to be reproduced to an error correcting circuit (ECC) 505. The error correcting circuit 505 executes error correction on the input data when there are some errors therein and transfers an error correction result to a video separation circuit 506. The video separation circuit 506 separates video data and audio data from the data and stores them in storage areas independent of each other in a cashe memory 507, separately. The video data and the audio data stored in the cashe memory 507 are read out following a request from a video reproduction circuit 508 and an audio reproduction circuit 509, respectively, and are subjected to a necessary signal processing in the video reproduction circuit 508 and the audio reproduction circuit 509 and are thereafter reproduced by a TV monitor 510 and a speaker 511.

Figure 6:
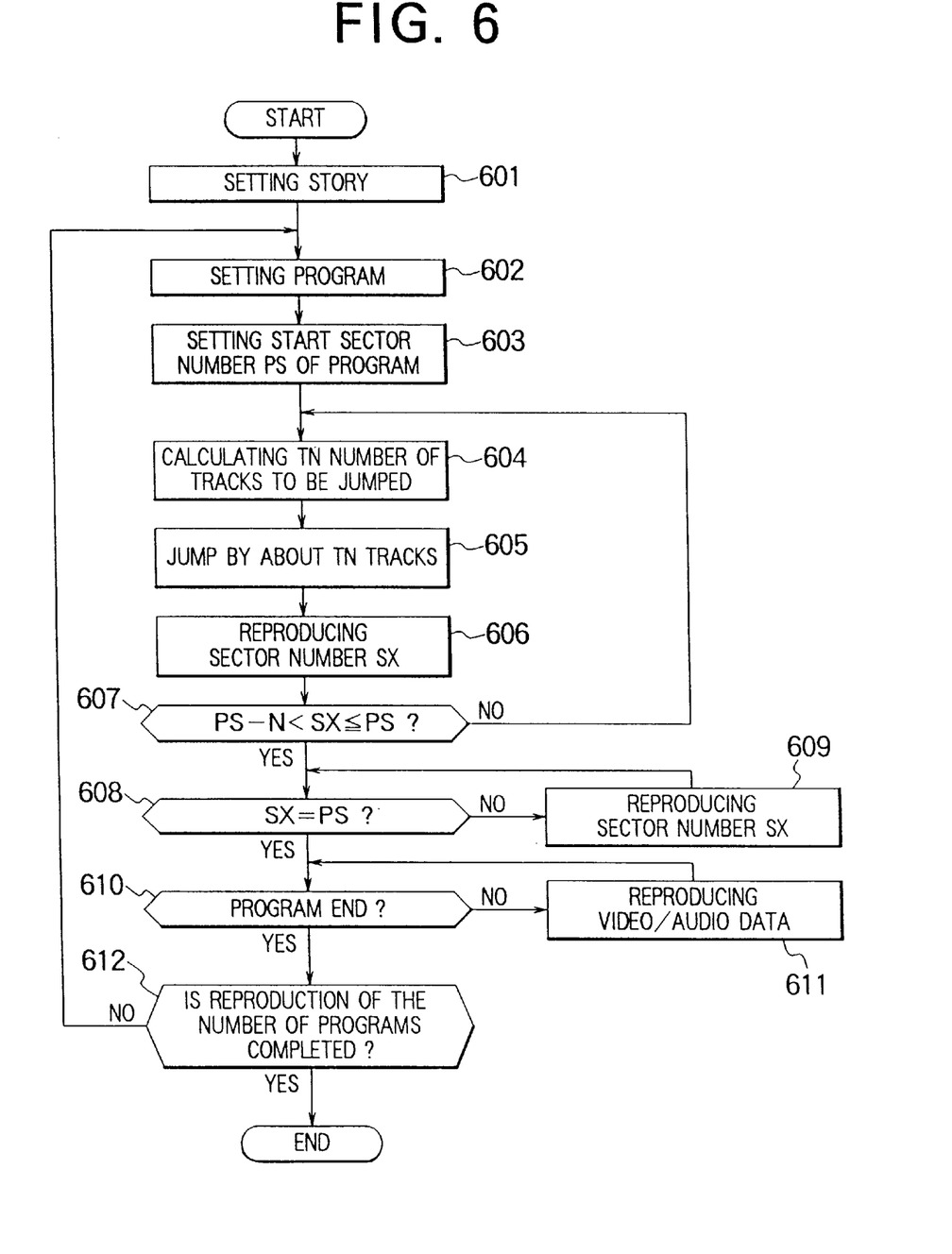
FIG. 6 is a flowchart illustrating a processing procedure when a story is reproduced.

FIG. 6 is a flowchart illustrating processing procedures that take place upon reproduction of a story.

In this case, the story is first selected and set on a control panel 512 in step 601. Then, the number of programs constituting the story which is desired to be reproduced is read out from the story control table illustrated in FIG. 3. The number is stored in a register 513 in step 602. Then, a start sector number of a first program of the story to be reproduced is read from the program control table illustrated in FIG. 4, and is stored in a register 514. Thereafter, a start sector number PS of the first program stored in the register 514 is set in a sector decision circuit 515 in step 603.

A track jump signal generation circuit 516 calculates a track number TN by which tracks are jumped on the basis of the start sector number PS set in the sector decision circuit 515 in step 604, and supplies a jump signal to a servo control circuit 517 that instructs the pickup 502 to jump by about the TN tracks. As a result, the pickup 502 jumps to the neighborhood of a target track in step 605.

Once the pickup 502 reaches the neighborhood of the target track, the synchronous reproduction circuit 504 reproduces a sector number SX in the synchronizing header 203 illustrated in FIG. 2 and stores the reproduced sector number SX in a register 518 in step 606.

The sector decision circuit 515 decides whether the sector number SX stored in the register 518 satisfies the following conditions or not in step 607:

PS−N<SX≦PS (N: sector number corresponding to, for example, one track)

If the reproduced sector number SX does not satisfy the above conditions, the track jump signal generation circuit 516 calculates a track number by which tracks should be further jumped, and supplies an instruction to the servo control circuit 517 to cause the pickup 502 to again jump the tracks.

If the reproduced sector number SX satisfies the above conditions, the reproduction of the sector number SX is continued in step 609, and thereafter if the reproduced sector number SX is coincident with the start sector number PS of the program in step 608, video and audio data are reproduced in step 611. Once the DUT of a program end is passed through in step 610, the reproduction of the video and audio signals is interrupted, and the operation is returned to the start of the flowchart for the next program. Since the operation time from the present program to the next program is short, the reproduced video and audio signals on the TV are apparently continuous.

In the optical disk reproduction apparatus of the present invention, the program end is decided by detecting the story number 208, and the program number and DUT number 209 in the SLD 204 illustrated in FIG. 2. Since a start sector number of the next program is determined by the next program head sector number 211 in the SLD 204, the number 211 is stored in the register 514 and read by the sector decision circuit 515 for further processing. Once the reproduction program number reaches the program number which has been stored in the register 513 and the reproduction of the video and audio signals is completed in step 612, the entire reproduction is concluded.

As another embodiment of the optical disk reproduction apparatus, a modification is contemplated wherein a program terminator code (all "1" for example) is inserted into the next program head sector number 211 of the SLD 204 of a sector in the final program. Consequently, the need for an area for recording a program number of a story on the disk is eliminated, and also as hardware a circuit for registering the information, e.g., the register 513 illustrated in FIG. 6 becomes unnecessary.

According to the present embodiment, the need for a large memory capacity in the optical disk reproduction apparatus for storing a control table as illustrated in FIGS. 3 and 4, for example, is eliminated by recording the SLD 204 constructed as illustrated in FIG. 2 on each sector.

Additionally, according to the present invention, when the disk after time Ts seconds is intended to be reproduced during the reproduction, that portion of the disk can be easily accessed. Operation in this case will be described below.

Figure 7:
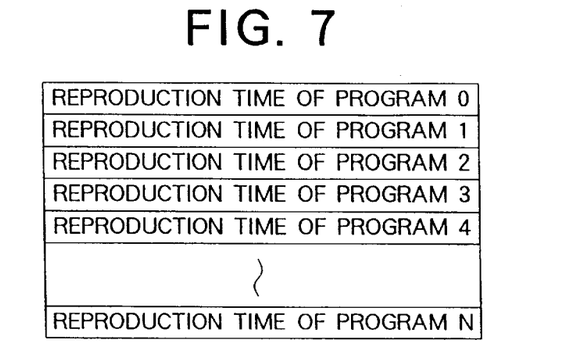
FIG. 7 is a view illustrating a reproduction time control table of each program.

First, a request for reproduction after the time Ts seconds is set on the control panel 512. A DUT number calculation circuit 519 first calculates a program number and a DUT number after the time Ts seconds. FIG. 7 illustrates the control table on which reproduction times of the respective programs 0–N have been registered. Since the reproduction times of the respective programs 0–N have been registered on the control table as described above, it is possible to calculate the position on the program after the time Ts seconds with reference to the control table. It is noted herein that in the control table illustrated in FIG. 7 the reproduction time may be denoted by the number of DUTs.

As an exemple, a case will be described where in reproduction of the story A the disk after Ts=1000 seconds is reproduced. It is herein assumed that the present program number is 0, and the DUT number is 20, and further concrete details of the control table in FIG. 7 are as follows.

Reproduction time of program 0=200 seconds
Reproduction time of program 1=300 seconds
Reproduction time of program 2=100 seconds
Reproduction time of program 3=400 seconds
Reproduction time of program 4=300 seconds Reproduction time T0 from the present DUT to the end of the program 0 is expressed by $$T0=200-0.5\times 20=190 \text{ seconds},$$

assuming that reproduction time of 1 DUT is 0.5 second. Accordingly, $$T0+T1+T2+T3=900 \text{ seconds},$$

the reproduction after Ts=1000 seconds may be executed at a portion 10 seconds after the initiation of the program 4. Namely, that portion is $$10/0.5=20$$

in DUT conversion, so that a portion from a DUT number 21 of the program 4 may be reproduced.

If the objective program number and the DUT number are calculated in this manner, a start sector number of the program 4 is then read from the program control table in FIG. 4, and set in the sector decision circuit 515 through the register 514.

The track jump signal generation circuit 516 calculates a track TN to be jumped from the start sector number SD set in the sector decision circuit 515, and supplies a jump signal to the servo control circuit 517 such that it jumps by about TN tracks. The pickup 502 then jumps to the neighborhood of the target track. Thereafter, the sector is reproduced at the jump destination and if the reproduced sector number is coincident with the foregoing start sector number SD in the sector decision circuit 515, the next DUT head sector number 214 of the SLD 204 is detected, and the sector number 214 is again stored in the register 514 and the jump operation is repeated. Thereafter, the target 21st DUT head sector is detected and video and audio data are reproduced. Hence, the reproduction after the time Ts seconds is reproduced. If the Ts is made short and made continuous, two times the speed of reproduction and four times the speed of reproduction are made possible.

Further, in the present embodiment, it is possible to retrieve a sector using other information in the SLD 204 as follows. In this instance, a specific retrieving table is unnecessary.

It is possible, for example, that the head sector of a program being reproduced up to then is retrieved from the head sector number 212 of the present program and the reproduction is again executed from the head of the same program. Similarly, it is possible to retrieve the head sector of a previous program with respect to the program reproduced up to that time. It is also possible to retrieve the head sector of a DUT including a sector reproduced up to that time from the head sector number 215 of the present DUT and it is also possible to retrieve the head sector of a previous DUT with respect to a DUT including a sector reproduced up to that time.

Even if the reproduction operation is interrupted owing to any trouble produced in the reproduction apparatus, provided the head sector of the control area is searched from the control area head sector number 205 and the control data is read, the processing can immediately be restarted.

Figure 8:
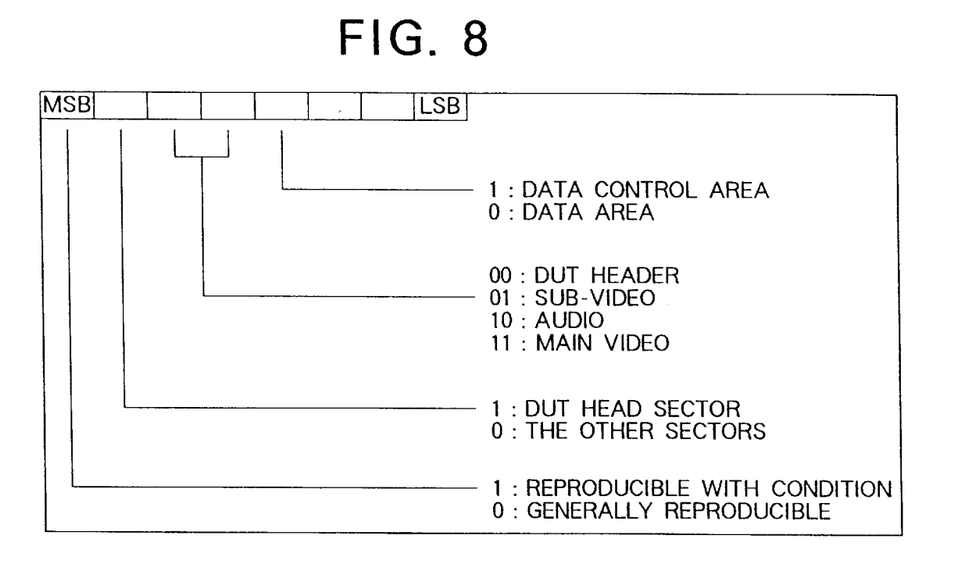
FIG. 8 is a view illustrating a detailed construction of a DUT identification.

Further, the DUT identification 210 is employed when it is impossible to search for some reasons what the present DUT indicates. More specifically, it is possible to decide what the present reproduction data indicates by reading the DUT identification 210. FIG. 8 is a view illustrating the detailed structure of the DUT identification 210. As illustrated in the same figure, the DUT identification 210 is composed of 1 byte data, the MSB (Most Significant Bit) of which indicates whether or not the DUT is reproducible without conditions. The 2nd bit indicates whether or not a sector itself is a DUT head sector. The 3rd and 4th bits indicate that data of the sector itself is any of a DUT header, a sub video, an audio, and a main video. Additionally, the 5th bit indicates that the sector itself is a control data area or a data area.

According to the recording medium and the reproduction apparatus of the present invention, at least address information of a head sector of the next program is recorded in each sector, so that a plurality of programs can be continuously reproduced following a reproduction order among programs which can be obtained without use of information of a control table. Thus a memory for the control table can be eliminated from the reproduction apparatus.

Additionally, the address information of the head sector of the next program and address information of the head sector of the next unit are recorded in each sector, so that the reproduction can be started from an arbitrary unit in the course of the program.

What is claimed is:

1. A method of recording/reproducing data, including video data and audio data, comprising:

recording a plurality of data units including video data and audio data on a recording medium, each data unit comprising a plurality of sectors, at least one data unit defining a first program and including a data unit header of a first data unit, wherein the data unit header includes sector link data, and wherein the sector link data includes a first address information identifying a header sector of a second program following the first program and a second address information identifying a head sector of a second data unit following the first data unit; and accessing a sector using one of the first address information or the second address information.

2. A method of recording/reproducing data, including video data and audio data, comprising:

recording a plurality of data units including video data and audio data on a recording medium, each data unit comprising a plurality of sectors, at least one data unit defining a first porgram and including a data unit header of a first data unit, wherein the data unit header includes sector link data, and wherein the sector link data includes a first address information identifying a head sector of a second program preceding the first program and a second address information identifying a head sector of a second data unit preceding the first data unit; and accessing a sector using one of the first address information or the second address information.

3. A disk comprising:

a plurality of data units including video data and audio data recorded thereon, each data unit comprising a plurality of sectors, at least one data unit defining a first program and including a data unit header of a first data unit, wherein the data unit header includes sector link data, and wherein the sector link data includes:

a first address information identifying a head sector of a second program following the first program, and a second address information identifying a head sector of a second data unit following the first data unit.

4. A disk comprising:

a plurality of data units including video data and audio data recorded thereon, each data unit comprising a plurality of sectors, at least one data unit defining a first program and including a data unit header of a first data unit, wherein the data unit header includes sector link data, and wherein the sector link data includes:

a first address information identifying a head sector of a second program preceding the first program, and a second address information identifying a head sector of a second data unit preceding the first data unit.

5. A reproducing apparatus for reproducing information from a disk on which a plurality of data units including video data and audio data are recorded, each data unit comprising a plurality of sectors, at least one data unit defining a first program and including a data unit header of a first data unit, wherein the data unit header includes sector link data, and wherein the sector link data includes a first address information identifying a head sector of a second program following the first program and a second address information identifying a head sector of a second data unit following the first data unit, the apparatus comprising:

a reading unit for reading the information on the disk; and control means for controlling the operation of the reproducing apparatus based on one of the first address information and the second address information.

6. A reproducing apparatus for reproducing information from a disk on which a plurality of data units including video data and audio data are recorded, each data unit comprising a plurality of sectors, at least one data unit defining a first program and including a data unit header of a first data unit, wherein the data unit header includes sector link data, and wherein the sector link data includes a first address information identifying a head sector of a second program preceding the first program and a second address information identifying a head sector of a second data unit preceding the first data unit, the apparatus comprising:

a reading unit for reading the information on the disk; and control means for controlling the operation of the reproducing apparatus based on one of the first address information and the second address information.

* * * * *